(12) United States Patent
Costello

(10) Patent No.: US 9,116,863 B1
(45) Date of Patent: Aug. 25, 2015

(54) SYSTEMS AND METHODS FOR ASSEMBLING DOCUMENTS

(75) Inventor: Matthew William Costello, Titusville, FL (US)

(73) Assignee: The Boeing Company, Chicago, IL (US)

( * ) Notice: Subject to any disclaimer, the term of this patent is extended or adjusted under 35 U.S.C. 154(b) by 149 days.

(21) Appl. No.: 13/362,916

(22) Filed: Jan. 31, 2012

(51) Int. Cl.
*G06F 17/00* (2006.01)
*G06F 17/21* (2006.01)

(52) U.S. Cl.
CPC ...................................... *G06F 17/21* (2013.01)

(58) Field of Classification Search
CPC .............. G06F 17/3089; G06F 17/248; G06F 17/30873; G06F 17/2247; G06F 17/227; G06F 17/212; G06F 17/21
USPC .......................................................... 715/256
See application file for complete search history.

(56) References Cited

U.S. PATENT DOCUMENTS

| | | | | |
|---|---|---|---|---|
| 5,483,651 A * | 1/1996 | Adams et al. | | 1/1 |
| 5,870,552 A * | 2/1999 | Dozier et al. | | 709/219 |
| 6,026,433 A * | 2/2000 | D'Arlach et al. | | 709/217 |
| 6,055,522 A * | 4/2000 | Krishna et al. | | 715/205 |
| 6,069,630 A * | 5/2000 | Lisle et al. | | 715/804 |
| 6,199,082 B1 * | 3/2001 | Ferrel et al. | | 715/205 |
| 6,356,903 B1 * | 3/2002 | Baxter et al. | | 707/702 |
| 6,405,221 B1 * | 6/2002 | Levine et al. | | 715/234 |
| 6,651,066 B2 * | 11/2003 | Baxter et al. | | 707/741 |
| 7,089,268 B2 * | 8/2006 | Yoshimura et al. | | 1/1 |
| 7,107,284 B1 * | 9/2006 | Betz et al. | | 1/1 |
| 7,200,668 B2 * | 4/2007 | Mak et al. | | 709/230 |
| 7,555,713 B2 * | 6/2009 | Yang | | 715/248 |
| 8,121,874 B1 * | 2/2012 | Guheen et al. | | 705/7.11 |
| 8,195,659 B2 * | 6/2012 | Hull et al. | | 707/736 |
| 2002/0069247 A1 * | 6/2002 | Paknad et al. | | 709/204 |
| 2003/0172343 A1 * | 9/2003 | Leymaster et al. | | 715/500 |
| 2005/0071310 A1 * | 3/2005 | Eiron et al. | | 707/1 |
| 2005/0177784 A1 * | 8/2005 | Andrews et al. | | 715/513 |
| 2006/0031746 A1 * | 2/2006 | Toepfer et al. | | 715/500 |
| 2006/0195454 A1 * | 8/2006 | Davis et al. | | 707/100 |
| 2007/0006072 A1 * | 1/2007 | Purvis | | 715/517 |
| 2007/0192671 A1 * | 8/2007 | Rufener | | 715/500 |
| 2007/0208755 A1 * | 9/2007 | Bhatkar et al. | | 707/10 |
| 2008/0086369 A1 * | 4/2008 | Kiat et al. | | 705/14 |
| 2009/0089293 A1 * | 4/2009 | Garritano et al. | | 707/10 |
| 2009/0113282 A1 * | 4/2009 | Schultz et al. | | 715/208 |
| 2009/0172005 A1 * | 7/2009 | LaToza et al. | | 707/102 |
| 2011/0161375 A1 * | 6/2011 | Tedder et al. | | 707/803 |
| 2011/0276918 A1 * | 11/2011 | Bennett | | 715/808 |
| 2012/0131445 A1 * | 5/2012 | Oyarzabal et al. | | 715/235 |
| 2012/0254730 A1 * | 10/2012 | Sunderland et al. | | 715/235 |
| 2012/0278705 A1 * | 11/2012 | Yang et al. | | 715/254 |

OTHER PUBLICATIONS

Zielczynski, Peter, Ph.D., "Requirements Management Using IBM Rational RequisitePro", IBM Press, 2008, pp. 1-333.*
ACCENTURE, Accenture Quick Document Builder, retrieved from www.accenture.com, created Jul. 4, 2011, 2 pages.

* cited by examiner

*Primary Examiner* — Laurie Ries
(74) *Attorney, Agent, or Firm* — Armstrong Teasdale LLP

(57) ABSTRACT

A document builder is provided. The document builder includes a memory unit configured to store a document outline, wherein the document outline includes at least a template link to a template and at least a mini-document link to each of a plurality of mini-documents, and a processing device. The processing device is configured to receive the document outline from the memory unit, retrieve the template using the template link, retrieve each of the plurality of mini-documents using the mini-document links, and automatically assemble a final document from the retrieved template and from the retrieved plurality of mini-documents.

20 Claims, 10 Drawing Sheets

FIG. 7A

Donate to Charity
Give Till it Hurts

Written by:

Table of Contents

1. Give Till it Hurts..............3
2. Contribution Worksheet..............4

1    Give Till It Hurts

PURPOSE: Help those who really need it
NOTE: Follow these steps carefully (1) Open your wallet (2) Find the largest bill you have (3) Donate it to charity (4) Repeat until your wallet is empty

FIG. 7D

2    Contribution Worksheet

PURPOSE: Record your contributions

| Date | Amount | Donation To | Notes |
|------|--------|-------------|-------|
|      |        |             |       |

SYSTEMS AND METHODS FOR ASSEMBLING DOCUMENTS

BACKGROUND

The field of the disclosure relates generally to manipulating documents, and more specifically, to systems and methods for assembling documents.

Documents such as requirements documents, test plans, and installation procedures may be complex, and often include individual sections that may span tens, if not hundreds, of pages. Accordingly, updating, reorganizing, editing, and/or creating such documents can be relatively time-consuming and/or labor-intensive. In lengthy documents, it may also be difficult to ensure that changes are made consistently throughout the document. Further, it may be difficult to apply consistent formatting to the overall document.

Further, some documents may include multiple instances of identical sections. In such documents, at least some known document assembly systems require users to manually input the same information in each of the identical sections. This process can be relatively time-consuming, and users may make errors when manually inputting the information.

Many users know how to create simple documents and/or how to create and update a basic spreadsheet. However, when generating relatively large and complicated documents, at least some known document assembly systems require users to have sophisticated programming experience to effectively utilize the document assembly systems. Accordingly, users with relatively limited programming experience may be unable to effectively use at least some known document assembly systems. Further, at least some known document assembly systems are unable to produce a final document with a consistent format and/or style. Moreover, at least some known document assembly systems are part of a larger system and cannot be implemented as a stand-alone tool.

BRIEF DESCRIPTION

In one aspect, a document builder is provided. The document builder includes a memory unit configured to store a document outline, wherein the document outline includes at least a template link to a template and at least a mini-document link to each of a plurality of mini-documents, and a processing device. The processing device is configured to receive the document outline from the memory unit, retrieve the template using the template link, retrieve each of the plurality of mini-documents using the mini-document links, and automatically assemble a final document from the retrieved template and from the retrieved plurality of mini-documents.

In another aspect a processing device is provided. The processing device is configured to receive a document outline that includes at least a template link to a template and at least a mini-document link to each of a plurality of mini-documents, retrieve the template using the template link, retrieve each of the plurality of mini-documents using the mini-document links, and automatically assemble a final document from the retrieved template and from the retrieved plurality of mini-documents.

In yet another aspect, a method for assembling a final document from a plurality of mini-documents is provided. The method includes receiving, at a processing device, a document outline that includes at least a template link to a template and at least a mini-document link to each of the plurality of mini-documents, retrieving, using the processing device, the template using the template link, retrieving, using the processing device, each of the plurality of mini-documents using the mini-document links, and automatically assembling, using the processing device, the final document from the retrieved template and from the retrieved plurality of mini-documents.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIGS. 7A-7D are pages of an exemplary final document.

DETAILED DESCRIPTION

The systems and methods described herein facilitate assembling a final document using a document outline. The document outline includes a link to a template that specifies the style and/or formatting of the final document. The document outline also includes links to a plurality of mini-documents that are to be incorporated into the final document. The document outline may also include text that is incorporated directly into the final document. Using the link to the template and the links to the plurality of mini-documents, a processing device automatically assembles the final document.

Technical effects of the methods and systems described herein include at least one of: (a) receiving a document outline that includes at least a template link to a template and at least a mini-document link to each of a plurality of mini-documents; (b) retrieving, using the processing device, the template using the template link; (c) retrieving, using the processing device, each of the plurality of mini-documents using the mini-document links; and (d) automatically assembling, using the processing device, a final document from the retrieved template and from the retrieved plurality of mini-documents.

Figure 1:
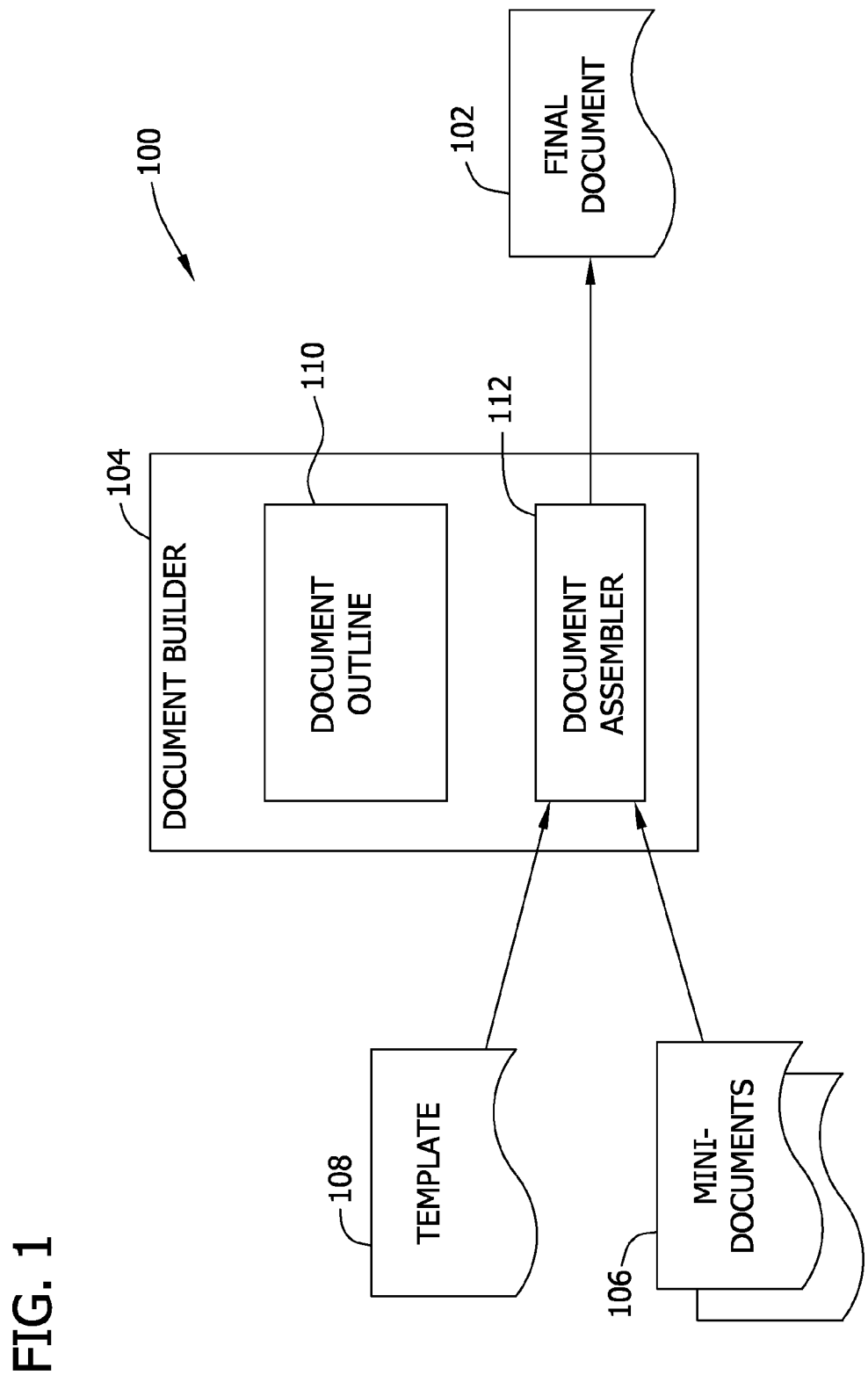
FIG. 1 is a diagram of an exemplary workflow that may be used to assemble a document.

FIG. 1 is a diagram of an exemplary workflow 100 that may be used to assemble a final document 102 using a document builder 104. In workflow 100, a plurality of mini-documents 106 are supplied to document builder 104. In the exemplary embodiment, a template 108 is also supplied to document builder 104. Using a document outline 110 and a document assembler 112, document builder 104 then assembles final document 102 from mini-documents 106 and template 108, as described in more detail below.

Template 108 defines the styles and/or formatting to be applied in final document 102. For example, template 108 may define the font, the text size, the margins, the indentations, the highlighting, the text color, the text emphasis (e.g., bold, underlined, italicized, etc.), and/or the line spacing in final document 102. Alternatively, template 108 may include any style and/or formatting that enables document builder 104 to function as described herein. In the exemplary embodiment, template 108 is a predefined template selected by a user, and includes preset styles and/or formatting. Alternatively, template 108 may be a custom template generated by a user. Further, template 108 is a .dot file in the exemplary embodiment. Alternatively, template is any type of file that enables document builder 104 to function as described herein.

Each mini-document 106 includes content to be incorporated in final document 102. In the exemplary embodiment, each mini-document 106 is the same type of document. For example, all mini-documents 106 may be word processing documents, spreadsheet documents, image documents, or presentation documents. Alternatively, at least one mini-document 106 may be a different type of document from the other mini-documents 106. Further, each mini-document 106 may include any document and/or data that enables document builder 104 to function as described herein. For example, mini-document 106 may include data in a structured format (e.g., XML), and, in at least some embodiments, data may be retrieved and inserted directly into the final document 102 in the structured format.

Each mini-document 106 may be incorporated only once or multiple times, into final document 102. Further, in the exemplary embodiment, each mini-document is a relatively short document (e.g., 1-5 pages). Alternatively, each mini-document 106 may have any length that enables document builder 104 to function as described herein.

Document builder 104 assembles final document 102 from mini-documents 106 and template 108 based on document outline 110. Specifically, in the exemplary embodiment, document outline 110 includes links to template 108 and mini-documents 106 to be used in generating final document 102. Each link specifies a storage location of the associated template 108 and/or mini-document 106. In the exemplary embodiment, a link is a file path specifying the unique location of associated template 108 and/or mini-document 106 in a file storage system. Alternatively, a link may include any information that specifies where an associated template 108 and/or mini-document 106 is located. For example, in some embodiments, link may be a hyperlink that specifies a network address at which an associated template 108 and/or mini-document 106 is located.

In one embodiment, template 108 and mini-documents 106 are stored in a data repository that includes a catalog and/or collection of various templates and mini-documents. The data repository is not limited to a database, but may include a file system that stores the templates and/or mini-documents. Further, in some embodiments, at least one of template 108 and mini-documents 106 may be stored in different data repositories, such that final document 102 is assembled by retrieving files from a plurality of different storage devices.

Document outline 110 also specifies the order in which mini-documents are to be incorporated into final document 102. In some embodiments, document outline 110 also includes plain text that may be automatically inserted and formatted into final document 102, as described in more detail below.

Document builder 104 includes document assembler 112 for use in assembling final document 102. Document assembler 112 receives document outline 110 and retrieves template 108 and mini-documents 106 from the appropriate data repository utilizing the links in document outline 110. Document assembler 112 then automatically generates final document 102 such that final document 102 includes mini-documents 106 inserted in the order specified in document outline 110, and with the style and/or formatting defined in template 108. Specifically, document assembler 112 automatically adjusts the style and/or formatting of each mini-document 106 to match the style and/or formatting defined in template 108 and to ensure that final document 102 has consistent style and/or formatting.

Final document 102 includes all of the content from mini-documents 106 organized according to document outline 110. Final document 102 also includes the formatting and/or styles defined in template 108. In the exemplary embodiment, final document 102 is a word processing document. For example, final document may be a requirements management document, a test plan document, and/or an installation instruction document. Alternatively, final document 102 may be any type of document and/or be in any suitable format (e.g., .doc, .docx .pdf, .xls, .rtf, .txt, .bmp, .gif, .jpeg, .tiff, etc.). Final document 102 may be assembled from any number of mini-documents 106. In the exemplary embodiment, final document 102 is a relatively long document (e.g., greater than 50 pages). Alternatively, final document 102 may have any suitable length.

In some embodiments, in addition to generating final document 102, document builder 104 outputs final document 102 to a database. The database may be predetermined or selected by a user operating document builder 104. Further, in some embodiments, final document 102 is output in a structured data format (e.g., XML). The structured data format may be predetermined or selected by a user operating document builder 104.

Figure 2:
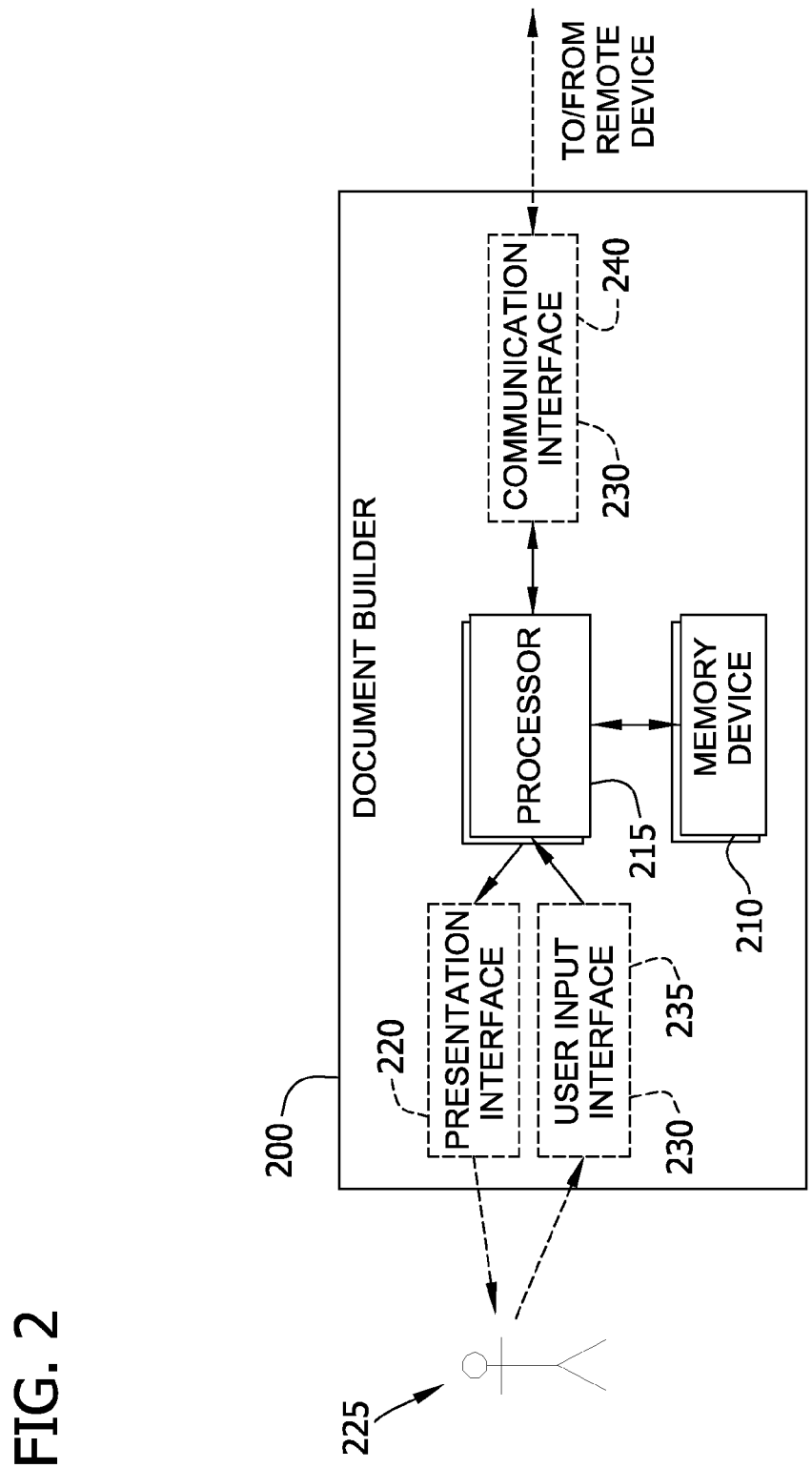
FIG. 2 is a block diagram of an exemplary document builder.

FIG. 2 is a block diagram of an exemplary document builder 200, such as document builder 104 (shown in FIG. 1), that may be used to assemble a final document, such as final document 102 (shown in FIG. 1). Document builder 200 includes at least one memory device 210 and a processor 215 that is coupled to memory device 210 for executing instructions. In some embodiments, executable instructions are stored in memory device 210. In the exemplary embodiment, document builder 200 performs one or more operations described herein by programming processor 215. For example, processor 215 may be programmed by encoding an operation as one or more executable instructions and by providing the executable instructions in memory device 210. In some embodiments, document builder 200 is accessible via a web-based interface such that a user may access document builder 200 without using a user device containing client software specific to document builder 200.

Processor 215 may include one or more processing units (e.g., in a multi-core configuration). Further, processor 215 may be implemented using one or more heterogeneous processor systems in which a main processor is present with secondary processors on a single chip. As another illustrative example, processor 215 may be a symmetric multi-processor system containing multiple processors of the same type. Further, processor 215 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary embodiment, memory device 210 is one or more devices that enable information such as executable instructions and/or other data to be stored and retrieved. Memory device 210 may include one or more computer readable media, such as, without limitation, dynamic random access memory (DRAM), static random access memory (SRAM), a solid state disk, and/or a hard disk. Memory device 210 may be configured to store, without limitation, application source code, application object code, source code portions of interest, object code portions of interest, configuration data, execution events and/or any other type of data.

In some embodiments, document builder 200 includes a presentation interface 220 that is coupled to processor 215. Presentation interface 220 presents information, such as application source code and/or execution events, to a user 225. For example, presentation interface 220 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 220 includes one or more display devices.

In the exemplary embodiment, document builder 200 includes an input interface 230, such as a user input interface 235. In the exemplary embodiment, user input interface 235 is coupled to processor 215 and receives input from user 225. User input interface 235 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 220 and user input interface 235.

In some embodiments, document builder 200 includes a communication interface 240 coupled to processor 215. Communication interface 240 communicates with one or more remote devices. To communicate with remote devices, communication interface 240 may include, for example, a wired network adapter, a wireless network adapter, and/or a mobile telecommunications adapter.

Processor 215 performs the operations of document assembler 112 (shown in FIG. 1) in the exemplary embodiment. That is, processor 215 receives a document outline, such as document outline 110 (shown in FIG. 1). The document outline may be stored in memory device 210. Upon receiving the document outline, processor 215 retrieves a template, such as template 108, and mini-documents, such as mini documents 106 (both shown in FIG. 1). As explained above, in the exemplary embodiment, the template and mini-documents are retrieved using links in the document outline. The template and the mini-documents may be stored in memory device 210 or any other suitable storage device. For example, in one embodiment, processor 215 retrieves the template and/or mini-documents via a wireless and/or wired network using communication interface 240. Once the template and the mini-documents are retrieved, processor 215 automatically assembles the final document.

Figure 3:
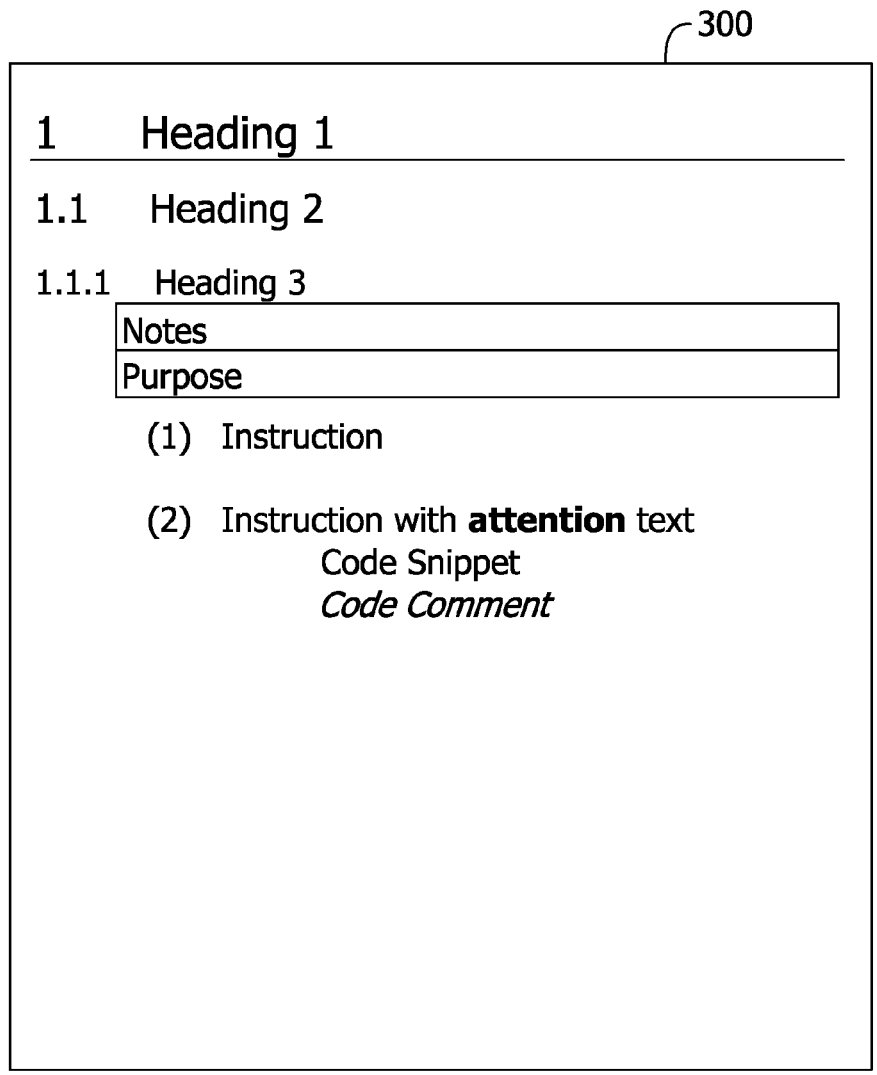
FIG. 3 is sample page illustrating styles and formatting specified in an exemplary template.

FIG. 3 is a sample page 300 illustrates styles and formatting specified in an exemplary template, such as template 108. Notably, the template itself does not include any visible content in the exemplary embodiment. Accordingly, sample page 300 merely illustrates how example styles (e.g., "Heading 1", "Notes", "Instruction", etc.) from the template would be applied to text in mini-documents.

Figure 4B:
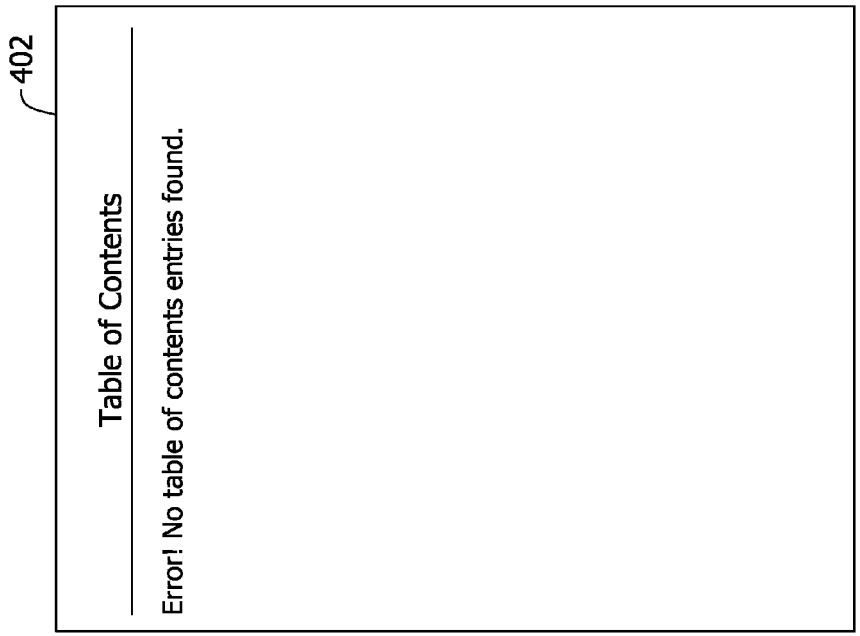
FIGS. 4A and 4B are pages of an exemplary Title Page mini-document.
Figure 4A:
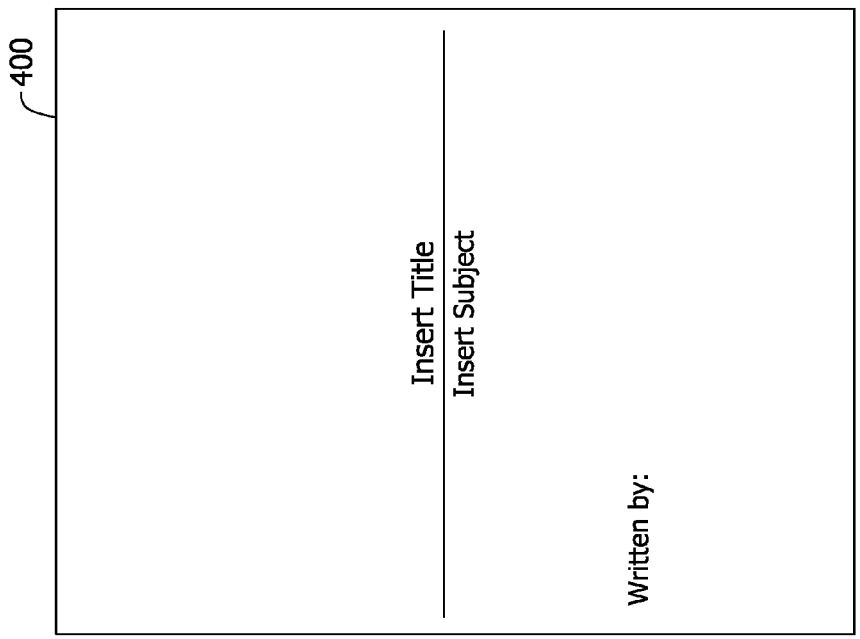

FIGS. 4A and 4B are a first page 400 and a second page 402, respectively, of an exemplary mini-document, such as mini-document 106. Pages 400 and 402 form a Title Page mini-document, wherein first page 400 includes title information, and second page 402 includes a table of contents. As described in detail below, in the exemplary embodiment, the table of contents of second page 402 is automatically populated with certain plain text entries during the document assembly process. Accordingly, as shown in FIG. 4B, before the document assembly process, second page 402 includes "Error! No table of contents entries found." because the table of contents has not yet been populated with plain text entries.

Figure 5:
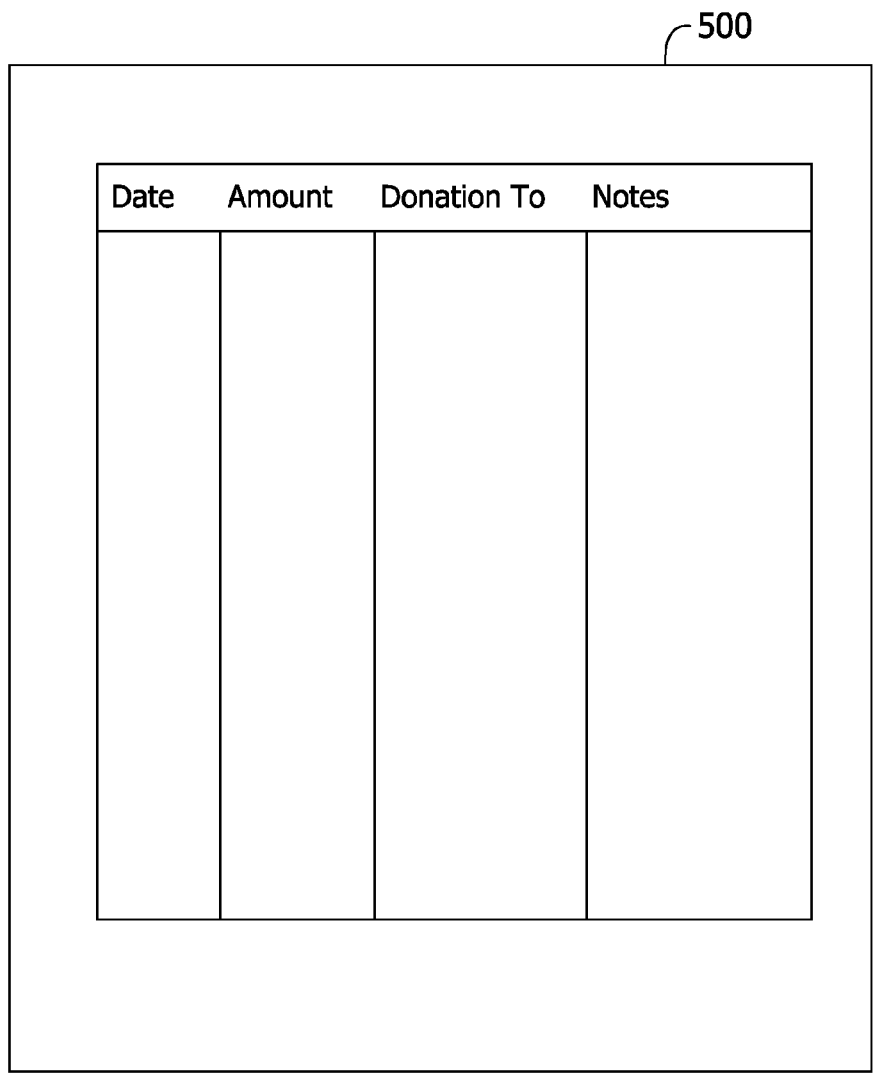
FIG. 5 is a page of an exemplary Worksheet mini-document.

FIG. 5 is a page 500 of an exemplary mini-document, such as mini-document 106. Page 500 forms a Worksheet mini-document, wherein page 500 includes a worksheet including rows and columns.

Figure 6:
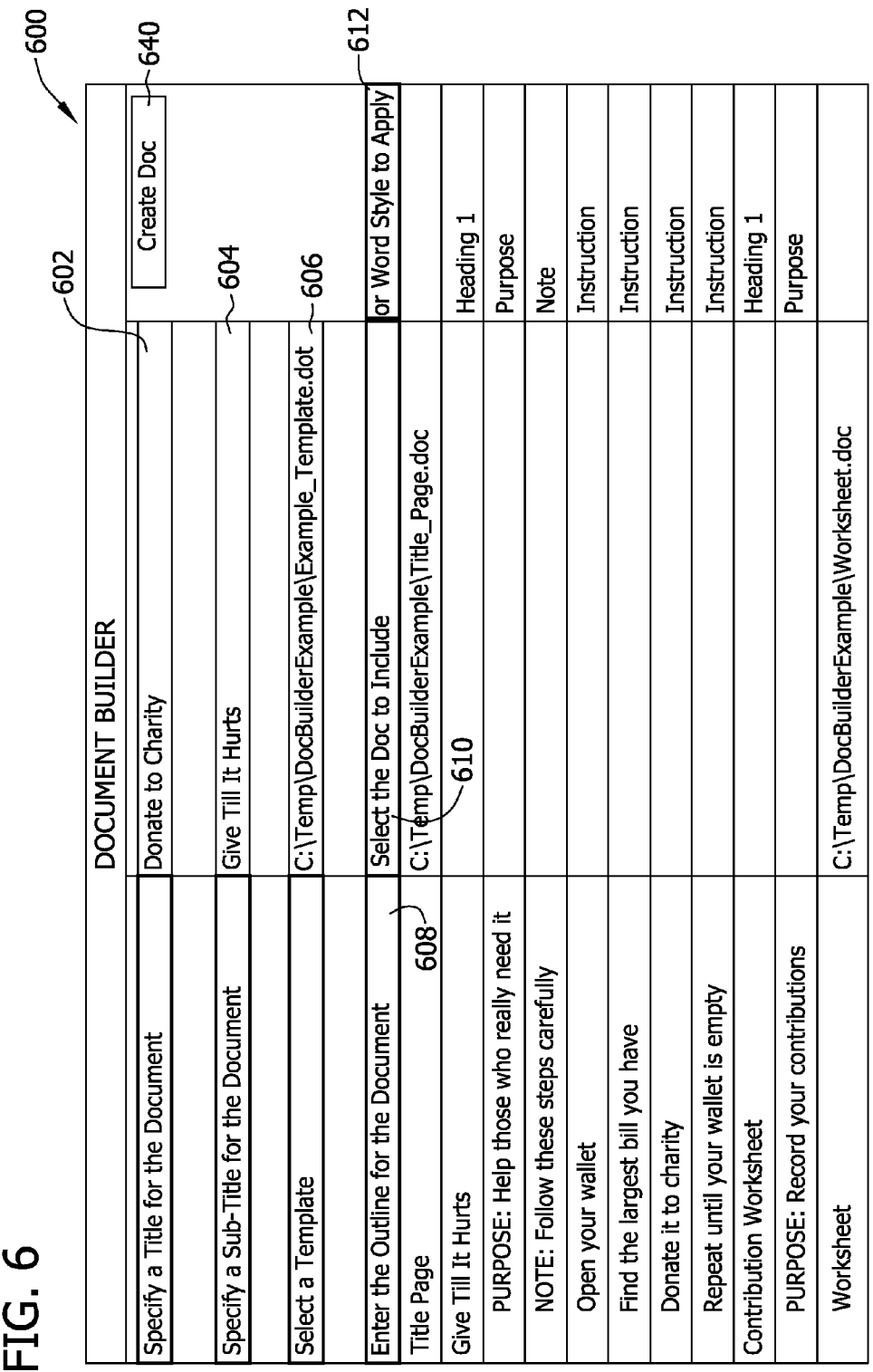
FIG. 6 is an exemplary document outline that may be displayed on a presentation interface of a document builder.

FIG. 6 is an exemplary document outline 600, such as document outline 110 (shown in FIG. 1), that may be displayed on a presentation interface of a document builder, such as presentation interface 220 of document builder 200 (both shown in FIG. 2). Using the presentation interface and a user input interface, such as user input interface 235, a user can populate document outline 600. Document outline 600 includes a title field 602 and a subtitle field 604. Using the user input interface, the user can enter the desired title of the final document in title field 602, and the desired subtitle (if applicable) in subtitle field 604.

Document outline 600 includes a template selection field 606 in the exemplary embodiment. In the exemplary embodiment, when the user selects template selection field 606, a window and/or prompt (not shown) is generated that enables the user to select the location of the desired template, such as template 108 (shown in FIG. 1). Once the user selects the location of the desired template, a link to the template is displayed in template selection field 606. Accordingly, in the exemplary embodiment, the user interface receives a user identification of the template link. Alternatively, the user may manually enter the link to the template in template selection field 606 without the use of a window and/or prompt.

In the exemplary embodiment, document outline 600 includes a name column 608, a mini-document link column 610, and a style column 612. Each of name column 608, mini-document link column 610, and style column 612 includes a plurality of fields.

Using the user input interface, the user can input the names of a plurality of mini-documents to be incorporated into the final document in name column 608, such as names of mini-documents 106 (shown in FIG. 1). Notably, in the exemplary embodiment, the names of the mini-documents are entered top to bottom in the same order that the mini-documents are to appear in the final document. For example, in document outline 600, the first mini-document name listed in name column 608 is "Title Page", corresponding to the Title Page mini-document shown in FIGS. 4A and 4B. Accordingly, the "Title Page" mini-document will be at the beginning of the assembled final document. In the exemplary embodiment, mini-document names in name column 608 are not included in the final document, but instead help a user organize the document outline. Alternatively, mini-document names in name column 608 may be included in the final document.

Fields in the mini-document link column 610 contain the link associated with a particular mini-document. In the exemplary embodiment, when the user selects a field in mini-document link column 610, a window and/or prompt (not shown) is generated that enables the user to select the location of the desired mini-document. Once the user selects the location of the desired mini-document, a link to the mini-document is displayed in the field. Accordingly, in the exemplary embodiment, the user interface receives a user identification of the mini-document link for each mini-document. Alternatively, the user may manually enter the link to the mini-document without the use of a window and/or prompt.

Notably, the fields in name column 608 can also include plain text to be incorporated into the final document. For example, in document outline 600, the entries "Give Till It Hurts" and "PURPOSE: Help those who really need it" are plain text, not names of mini-documents. These plain text entries will also be incorporated into the final document. Notably, as plain text entries do not have an associated link, fields in mini-document link column 610 are blank for plain text entries.

The style and/or formatting applied to the plain text in the final document can be specified in style column 612. For example, in document outline 600, "Give Till It Hurts" will appear with the style "Heading 1", and "PURPOSE: Help those who really need it" will appear with the style "Purpose" in the final document. Styles entered into style column 612 may be entered manually by the user or selected from a list, such as a drop-down list. Further, styles may be predefined or custom-generated by the user. In the exemplary embodiment, the styles entered into style column 612 correspond to styles in template 108. Alternatively, styles in style column 612 are different from styles in template 108.

In the exemplary embodiment, name column 608 includes the names of mini-documents as well as plain text entries. Alternatively, name column 608 may include only plain text entries. That is, in some embodiments, the final document may be formed entirely of plain text entries, and may be formed without using any mini-documents.

In the exemplary embodiment, document outline 600 includes a create document button 640. After title field 602, subtitle field 604, template selection field 606, name column 608, mini-document link column 610, and/or style column 612 are filled, selection of create document button 640 causes a document assembler, such as document assembler 112 (shown in FIG. 1), to automatically assemble document. The document assembler retrieves the appropriate templates and mini-documents from the links in template selection field 606 and mini-document link column 610, respectively. The retrieved template and mini-documents are then used to assemble the final document.

FIGS. 7A-7D are a first page 700, second page 702, third page 704, and fourth page 706 of an exemplary final document generated, such as final document 102 (shown in FIG. 1). Pages 700-706 are generated using the Title Page mini-document shown in FIGS. 4A and 4B, the Worksheet mini-document shown in FIG. 5, and document outline 600 shown in FIG. 6.

First page 700 corresponds to first page 400 of the Title Page mini-document. As shown in FIG. 7A, a processing device, such as processor 215 (shown in FIG. 2) automatically inserts the "Donate to Charity" from title field 602 and "Give Till it Hurts" from subtitle field 604 into the first page 400 to generate first page 700.

Second page 702 corresponds to second page 402 of the Title Page mini-document. As shown in FIG. 7B, in the exemplary embodiment, the processing device automatically inserts plain text entries having the style "Heading 1" into the table of contents on second page 402 to generate final document second page 702. Specifically, in the exemplary embodiment, the processing device checks to see if document outline 600 includes any plain text entries having the style "Heading 1", and populates the table of contents with any such entries.

Third page 704 is generated entirely from plain text entries in document outline 600. That is, no mini-documents are used in generating third page 704. Accordingly, the processing device uses the plain text entries in name column 608 and the corresponding style and/or formatting in style column 612 to automatically generate third page 704.

Fourth page 706 is generated from plain text entries and a mini-document. Specifically, as shown in FIG. 7D, the processing device includes the "Contribution Worksheet" and "PURPOSE: Record your contributions" plain text entries in page 706. Further, the Worksheet mini-document (i.e., page 500) is incorporated into page 706.

In the exemplary embodiment, the specified styles and/or formatting of mini-documents 106 are incorporated into final document 102 in a context-sensitive manner by incrementing the style and/or formatting appropriately. For example, assume that page 500 of the Worksheet mini-document includes a heading having the style "Heading 1", as specified by template 108. Notably, in the document outline 600, the Worksheet mini-document is incorporated as a subcomponent of the plaintext entry "Contribution Worksheet", which also has the style "Heading 1".

Accordingly, when document builder 104 incorporates the Worksheet mini-document as a subcomponent of the plaintext entry "Contribution Worksheet", document builder 104 determines, based on the context (i.e., "Contribution Worksheet" already has "Heading 1", and the Worksheet mini-document is to be a subcomponent of "Contribution Worksheet"), that the style of the heading in the Worksheet mini-document should be incremented by one for consistency. That is, instead of appearing in the style "Heading 1", as specified in template 108, the heading of the Worksheet mini-document will appear in the style "Heading 2". While the previous example describes incorporating styles and/or formatting in a context-sensitive manner in a final document that is a word processing document, styles and/or formatting may be similarly incorporated in a context-sensitive manner for spreadsheet documents, presentation documents, and/or any other suitable type of document. Alternatively, styles and/or formatting in mini-documents 106 may not be incorporated into final document 102 in a context-sensitive manner, but may simply be the styles and/or formatting specified in template 108.

Figure 8:
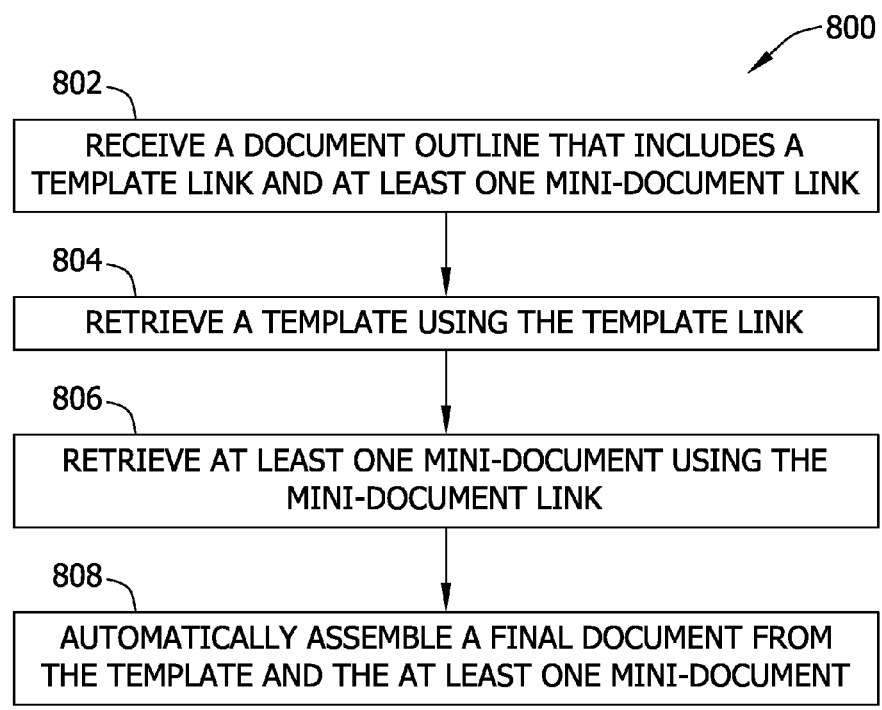
FIG. 8 is a flowchart of an exemplary method for assembling a final document from at least one mini-document.

FIG. 8 is a flowchart of an exemplary method 800 for assembling a final document, such as final document 102 from at least one mini-document 106 (both shown in FIG. 1). In the exemplary embodiment, method 800 is performed by a processing device of a document assembler, such as processor 215 (shown in FIG. 2) of document builder 104 (shown in FIG. 1).

Method 800 includes receiving 802 a document outline that includes a template link and at least one mini-document link. The document outline may also include at least one plain text entry, as described above. Using the template link, a template, such as template 108 (shown in FIG. 1) is retrieved 804. Using the at least one mini-document link, at least one mini-document, such as mini-document 106 (shown in FIG. 1) is retrieved 806. From the template and the at least one-mini document, the final document is automatically assembled 808 from the template, the mini-document, and any plain text entries.

Figure 9:
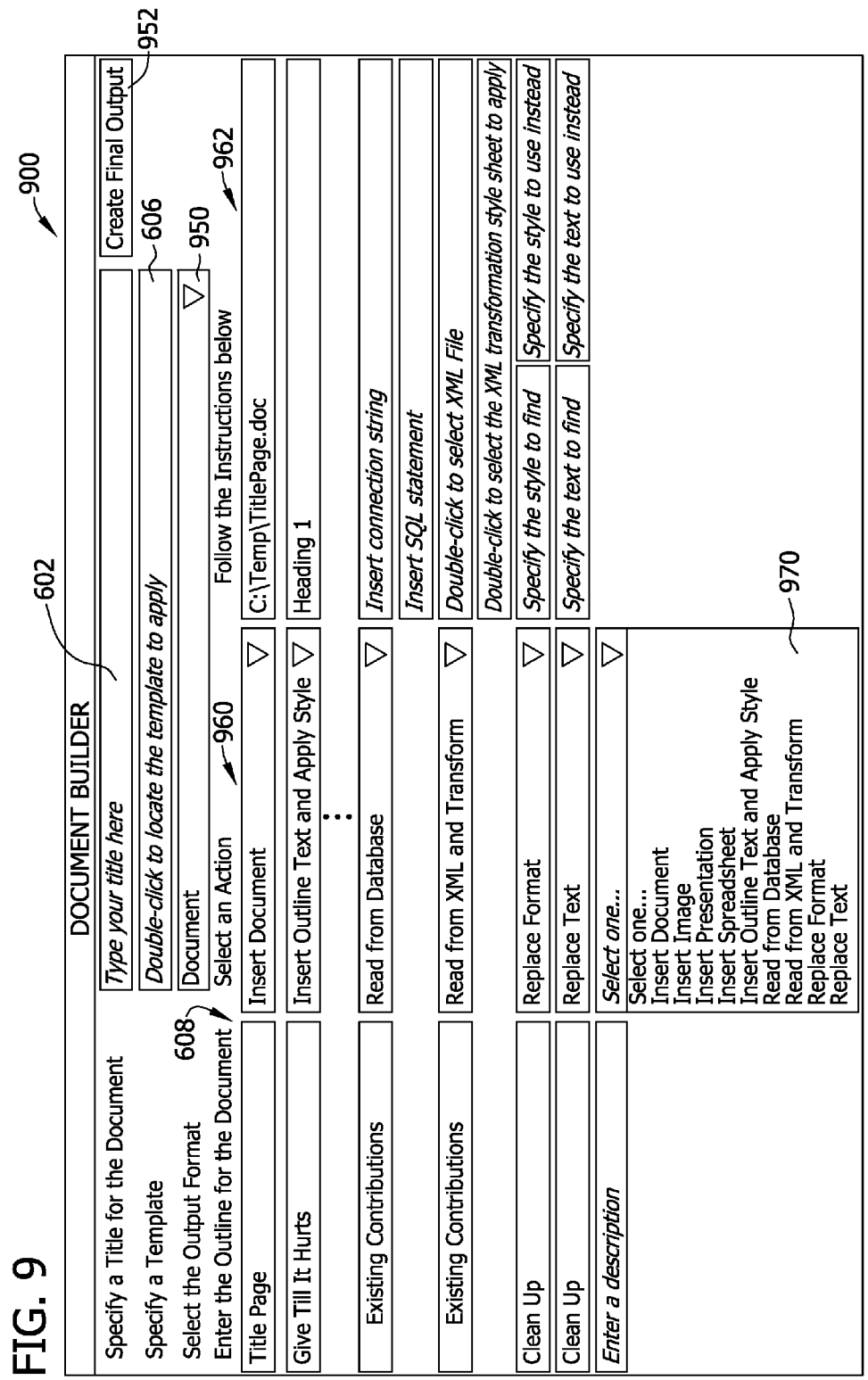
FIG. 9 is an alternative document outline that may be displayed on a presentation interface of a document builder.

FIG. 9 is an alternative document outline 900, such as document outline 110 (shown in FIG. 1), that may be displayed on a presentation interface of a document builder, such as presentation interface 220 of document builder 200 (both shown in FIG. 2). Similar to document outline 600, document outline 900 includes title field 602 and template selection field 606. Document outline 900 also includes an output format selection field 950.

Using output format selection field 950, a user may specify an output format of the final document. In the exemplary embodiment, output format selection field 950 is a drop down menu. Output format options may include, for example, a word processing document, a spreadsheet document, outputting the final document to a database, or outputting the final document in a structured format (e.g., XML). Accordingly, when a user selects a create final output button 952, the final document is created and also output as specified in the output format selection field 950.

Similar to document outline 600, document outline 900 includes name column 608. However, instead of mini-document link column 610 and style column 612, document outline 900 includes an action column 960 and an instruction column 962. In the exemplary embodiment, fields in action column 960 each include a drop down menu 970 that enables a user to select different actions. When generating the final document, the selected action in action column is performed according to an instruction in a corresponding field in instruction column, as described in detail below. Further, selection of a particular action modifies the available fields in instruction column 962. While a number of specific actions are described herein, these specific actions are merely exemplary, and do not limit the scope of actions that may be available in document builder 200.

In the exemplary embodiment, to insert a mini-document that is a word processing document, a user selects an "Insert Document" action in action column. In response, document outline 900 prompts the user to insert a mini-document link in instruction column 962, similar to the mini-document links in mini-document link column 610 of document outline 600. Drop down menu 97 also includes different actions to insert different types of mini-documents (e.g., an "Insert Image" action for an image mini-document, an "Insert Presentation" action for a presentation mini-document, and an "Insert Spreadsheet" action for a spreadsheet document).

To insert a plain text entry, a user selects an "Insert Outline Text and Apply Style" action in the exemplary embodiment. In response, document outline 900 prompts the user to enter a style and/or formatting in instruction column 962 to be applied to the plain text entry in the final document, similar to the styles and/o formatting in style column 612 of document outline 600.

To read data from a database and insert the read data into the final document, in the exemplary embodiment, a user selects a "Read from Database" action. In response, document outline 900 prompts the user to insert a connection string and SQL statement for the data. Further, to read data from an XML document and transform the XML data, a user selects a "Read from XML and Transform" action. In response, document outline 900 prompts the user to select an XML file to read data from, and an XML transformation style sheet to apply to the XML data in the final document.

Document outline 900 also enables a user to find and replace a style/format and/or text in the final document. In the exemplary embodiment, by selecting a "Replace Format" action, document outline 900 prompts a user to specify a style/format to find, and a replacement style/format to use instead. Similarly, in the exemplary embodiment, by selecting a "Replace Text" action, document outline 900 prompts a user to specify text to find, and replacement text to use instead The embodiments described herein facilitate assembling a final document using a document outline. The document outline includes a link to a template that specifies the style and/or formatting of the final document. The document outline also includes links to a plurality of mini-documents that are to be incorporated into the final document. Using the link to the template and the links to the plurality of mini-documents, a processing device automatically assembles the final document.

Unlike at least some known document assembly systems, the document builder described herein provides a user interface that enables a user to quickly and easily generate a large, complex document. Specifically, the document builder described herein facilitates generating a large, complex document for smaller, more manageable mini-documents. In contrast to at least some known document assembly systems, the document builder described herein utilizes a template to ensure consistent formatting and/or style in a final assembled document. Moreover, the document builder described herein can be utilized in a wide variety of fields to assemble a wide variety of documents. Further, the document builder described herein does not require extensive programming knowledge to operate, and is relatively inexpensive and simple to implement. Finally, the document builder described herein may be implemented as a stand-alone tool, as opposed to at least some known document assembly systems, which form part of a larger overall system.

The embodiments described herein may utilize executable instructions embodied in a computer readable medium, including, without limitation, a storage device or a memory area of a computing device. Such instructions, when executed by one or more processors, cause the processor(s) to perform at least a portion of the methods described herein. As used herein, a "storage device" is a tangible article, such as a hard drive, a solid state memory device, and/or an optical disk that is operable to store data.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A document builder comprising:
 a memory unit configured to store a document outline, wherein the document outline includes at least a template link section to insert a link to a template and at least a mini-document link section to insert links to each of a plurality of mini-documents; and
 a processing device configured to:
  receive the document outline from said memory unit;
  receive, from a user, a request to insert a link to a template in the template link section;
  receive, from the user, a request to insert a link to each of a plurality of mini-documents in the mini-document link section; and
  upon receiving a request to assemble a final document:
   retrieve the template using the template link inserted in the document outline at the request of the user;
   retrieve each of the plurality of mini-documents using the mini-document links inserted in the document outline at the request of the user;
   automatically assemble the final document, the assembled final document including the retrieved plurality of mini-documents in a format specified by the template;
   generate the final document; and
   output the final document to a database.

2. A document builder in accordance with claim 1, further comprising a user interface configured to generate the document outline from user input.

3. A document builder in accordance with claim 2, wherein said user interface is configured to:
receive a title of the final document from the user;
receive a user identification of the template link; and
receive a user identification of the mini-document links.

4. A document builder in accordance with claim 2, wherein said processing device is configured to output the final document to a database identified in the document outline.

5. A document builder in accordance with claim 1, wherein said processing device is configured to automatically assemble the final document by incorporating the plurality of mini-documents into the final document in a context-sensitive manner.

6. A document builder in accordance with claim 1, wherein the template specifies at least one of a style and a format to be applied to the final document.

7. A document builder in accordance with claim 1, wherein the document outline includes a defined order mini-documents, wherein the request to insert the links to each of the plurality of mini-documents in the mini-document link section includes a request, from the user, to insert the links to each of the plurality of mini-documents in the defined order, and wherein said processing device is configured to assemble the final document such that the mini-documents are incorporated into the final document in the order specified in the document outline.

8. A document builder in accordance with claim 1, wherein the document outline further includes at least one plain text entry and a style associated with the at least one plain text entry, and wherein said processing device is configured to incorporate the at least one plain text entry into the final document in the associated style.

9. A processing device configured to:
receive a document outline that includes at least a template link section to insert a link to a template and at least a mini-document link section to insert links to each of a plurality of mini-documents;
receive, from a user, a request to insert a link to a template in the template link section;
receive, from the user, a request to insert a link to each of a plurality of mini-documents in the mini-document link section; and
upon receiving a request to assemble a final document:
retrieve the template using the template link inserted in document outline at the request of the user;
retrieve each of the plurality of mini-documents using the mini-document links inserted in the document outline at the request of the user;
automatically assemble the final document, the assembled final document including the retrieved plurality of mini-documents in a format specified by the template;
generate the final document; and
output the final document to a database.

10. A processing device in accordance with claim 9, wherein said processing device is configured to receive a document outline that includes a title for the final document.

11. A processing device in accordance with claim 9, wherein said processing device is configured to retrieve a template that includes at least one of a style and a format to be applied to the final document.

12. A processing device in accordance with claim 9, wherein said processing device is configured to automatically assemble the final document by incorporating the plurality of mini-documents into the final document in a context-sensitive manner.

13. A processing device in accordance with claim 9, wherein said processing device is configured to receive a document outline that includes an order of the plurality of mini-documents, and wherein said processing device is configured to assemble the final document such that the mini-documents are incorporated into the final document in the order specified in the document outline.

14. A processing device in accordance with claim 9, wherein said processing device is configured to receive a document outline that includes at least one plain text entry and a style associated with the at least one plain text entry, and wherein said processing device is configured to incorporate the at least one plain text entry into the final document in the associated style.

15. A method for assembling a final document from a plurality of mini-documents, said method comprising:
receiving, at a processing device, a document outline that includes at least a template link section to insert a link to a template and at least a mini-document link section to insert links to each of the plurality of mini-documents;
receiving, from a user, a request to insert a link to a template in the template link section;
receiving, from the user, a request to insert a link to each of a plurality of mini-documents in the mini-document link section; and
upon receiving a request to assemble the final document:
retrieving, using the processing device, the template using the template link inserted in the document outline at the request of the user;
retrieving, using the processing device, each of the plurality of mini-documents using the mini-document links inserted in the document outline at the request of the user;
automatically assembling, using the processing device, the final document, the assembled final document including the retrieved plurality of mini-documents in a format specified by the template;
generating the final document; and
outputting the final document to a database.

16. A method in accordance with claim 15, wherein automatically assembling the final document comprises automatically assembling the final document by incorporating the plurality of mini-documents into the final document in a context-sensitive manner.

17. A method in accordance with claim 15, wherein receiving a document outline comprises receiving a document outline that includes an order of the plurality of mini-documents, and automatically assembling the final document comprises assembling the final document such that the mini-documents are incorporated into the final document in the order specified in the document outline.

18. A method in accordance with claim 15, wherein receiving a document outline comprises receiving a document outline that includes at least one plain text entry and a style associated with the at least one plain text entry, and wherein said method further comprises incorporating the plain text entry into the final document in the associated style.

19. A method in accordance with claim 15, wherein automatically assembling the final document comprises automatically assembling the final document from the retrieved template, the retrieved plurality of mini-documents, and based on the document outline.

20. A method in accordance with claim 15, further comprising automatically adjusting at least one of style or formatting of one or more of the plurality of mini-documents to match at least one of a style and formatting defined in the retrieved template.

* * * * *